March 23, 1965  M. A. BROWN ETAL  3,175,125
MOTOR CONTROL BOX
Filed April 14, 1961  3 Sheets-Sheet 1
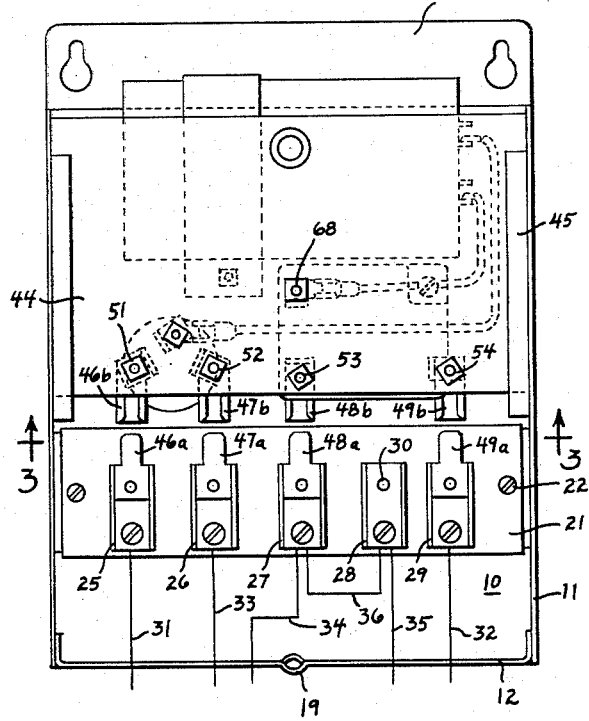
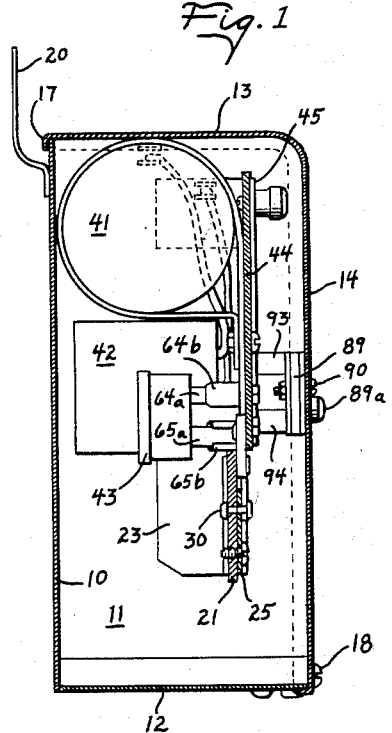
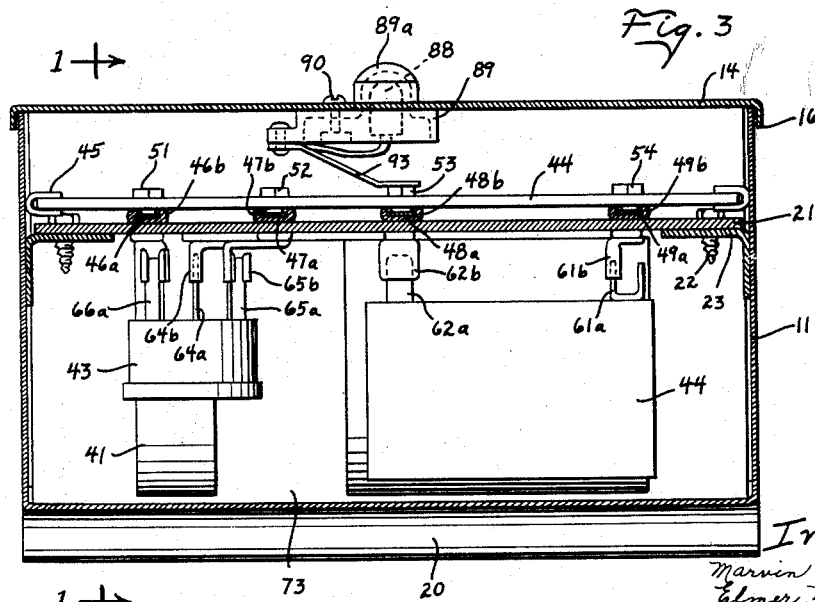

March 23, 1965   M. A. BROWN ETAL   3,175,125
MOTOR CONTROL BOX
Filed April 14, 1961   3 Sheets-Sheet 2
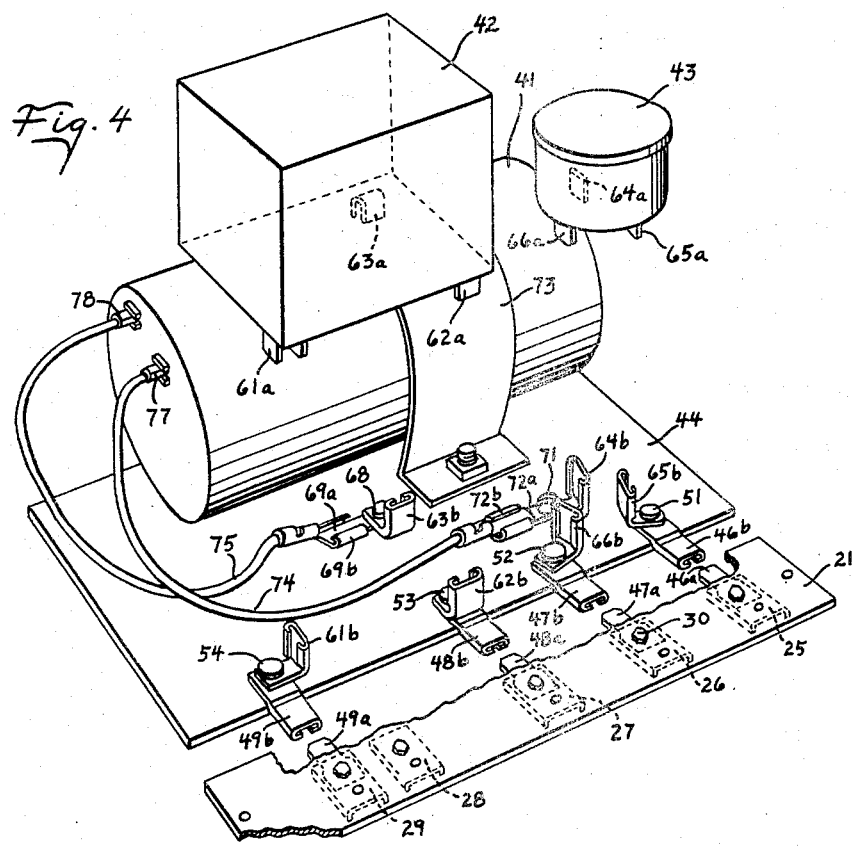
Fig. 4
Fig. 5
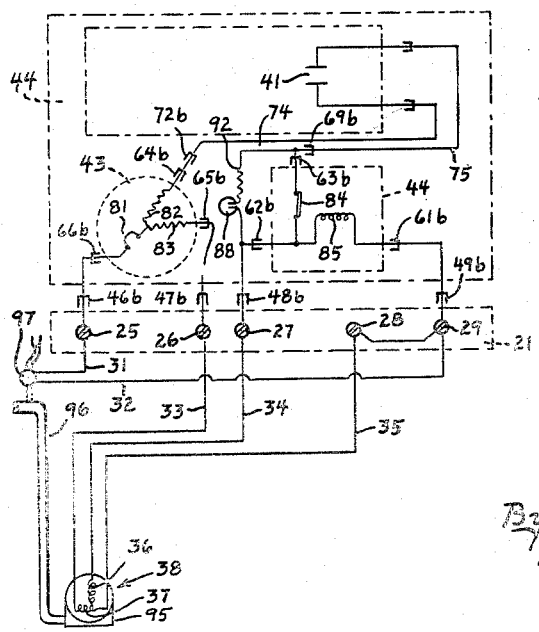
Inventor
Marvin A. Brown
Elmer M. Deters
By McCanna, Morsbach & Pillote
Atty's March 23, 1965  M. A. BROWN ETAL  3,175,125
MOTOR CONTROL BOX Filed April 14, 1961  3 Sheets-Sheet 3

Inventor
Marvin A. Brown
Elmer M. Deters
By
McCanna, Morsbach & Pillote
Atty's

United States Patent Office 3,175,125
Patented Mar. 23, 1965

3,175,125
MOTOR CONTROL BOX
Marvin A. Brown and Elmer M. Deters, Davenport, Iowa, assignors to Red Jacket Manufacturing Company, Davenport, Iowa, a corporation of Iowa
Filed Apr. 14, 1961, Ser. No. 103,015
6 Claims. (Cl. 317—99)

This invention relates to motor control boxes for use in applications wherein the motor controls are located remote from the motor.

In certain installations, such as in submersible motors used in pumping systems, and in motors used in sealed refrigeration systems and the like, it is advantageous to locate the motor controls including the relays and motor capacitor in a separate control box remote from the motor. In such installations, the power conductors and the conductors leading to the main and start windings of the motor are each connected to the components in the control box. It is not always possible to properly check the components while they are in the box and connected in the system and, in previous control box constructions, it has been necessary to either individually disconnect the several components from the control box or, alternatively to disconnect all of the power and motor conductors from the box and then remove the entire control box from the wall in order to enable checking the components. Since the wires in some motor installations are of relatively heavy gauge, removal and reconnection of the wires is somewhat difficult and time consuming.

An important object of this invention is to provide a motor control box containing the control elements for a remote motor, and which control box is arranged to facilitate checking and servicing of the motor control elements or components.

Another object of this invention is to provide a motor control box containing the motor control relays and motor capacitors for a remote motor in which the motor control components can be easily disconnected and removed as a unit from the control box for checking and repair, and without the use of any tools.

A more particular object of this invention is to provide a motor control box in which the motor controls including the relays and capacitor are mounted on a removable component board and the power conductors and motor conductors are connected to a fixed terminal board on the control box housing, and plug-in type connectors are provided to detachably connect the motor components on the removable board to the conductors on the fixed board so that the motor control elements can be readily installed and removed as a unit.

Another object of this invention is to provide a motor control box in accordance with the foregoing object in which the individual motor control elements can be easily installed and removed from the removable component board, for individual checking and repair.

Yet another object of this invention is to provide a motor control box in which the motor control components are mounted on the removable component board, and which has a pilot lamp mounted on the control box housing and an improved arrangement for detachably connecting the pilot lamp to terminals on the removable component board when the board is positioned in the control box housing.

Still another object of this invention is to provide a motor control box which is simple in construction and which requires a minimum of wires in the control box to operatively connect the several motor control components to each other and to the power and motor conductors.

These, together with various ancillary objects and advantages of this invention will be more readily appreciated as the same becomes better understood by reference to the following detailed description when taken in connection with the accompanying drawings wherein:

FIGURE 1 is a vertical sectional view through the control box taken on the plane 1—1 of FIG. 3;

FIG. 2 is a front view of the control box with the cover removed and with the removable component board in a partially assembled position;

FIG. 3 is a horizontal sectional view taken on the plane 3—3 of FIG. 1;

FIG. 4 is an exploded perspective view of the fixed and the removable component board, and the motor control components;

FIG. 5 is a schematic diagram illustrating the connection of the motor controls to a remote motor;

Figure 6:
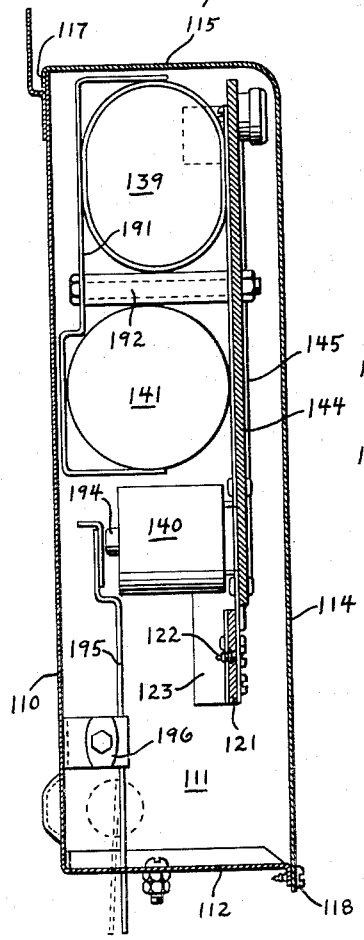
FIG. 6 is a vertical sectional view through a modified control box having a motor start and a motor running capacitor.

Referring more specifically to FIGS. 1–3, the motor control box includes a housing having a rear wall 10, spaced side walls 11 and a bottom wall 12 secured to the side and rear walls. A generally L-shaped cover including a top wall 13 and a front wall 14 is removably attached to the housing and, as shown, has a side flange 16 which overlies the outer faces of the side walls 11, and a depending lip 17 which engages the rear wall adjacent its upper end. A fastener 18 is threadable into a socket 19 formed on the bottom wall 12 to detachably retain the cover in position. A mounting bracket 20 is attached to the rear wall adjacent its upper end for mounting the housing on a supporting surface.

A fixed terminal board 21 is rigidly mounted on the housing. As best shown in FIGS. 1 and 3, the terminal board is attached by fasteners 22 to generally L-shaped brackets 23 which are welded or otherwise secured to the side walls 11 of the housing. The fixed terminal board 21 extends crosswise of the housing and is spaced inwardly from the front wall 14. The board 21 has a plurality of wire connector terminals mounted thereon, herein shown five in number and designated 25–29. The wire connector terminals are each rigidly secured to the board, as by fasteners 30. The several conductors including power conductors 31 and 32, and the conductors 33, 34 and 35 leading to the main and start windings 36 and 37 of the motor 38 are connected to the terminals 25–29.

The motor control illustrated in FIGS. 1–5 is for a capacitor-start motor and includes a starting capacitor 41, a motor start relay 42 and an overload relay 43. In accordance with the present invention, each of the motor control components are mounted on a removable component board 44 formed of insulating material, for removal and insertion as a unit therewith. The component board is advantageously mounted in channel-shaped guideways 45 secured to opposed side walls 11 of the control box housing, and the component board is slidable along the guideways toward and away from the fixed terminal board 21. A plurality of sets of plug-in type connectors, herein sometimes referred to as board connectors, are provided for connecting the components on the component board 44 with the wire connector terminals on the terminal board 21. As shown in FIGS. 1–5, four sets of plug-in type connectors are provided and include a first group of elements 46a–49a rigidly mounted on and electrically connected to terminals 25, 26, 27 and 29 respectively on the fixed terminal board 21. The connectors also include slidably interfitting elements 46b–49b mounted on the removable component board 44, as by fasteners 51–54. The connector elements 46a–49a are positioned on the fixed board and the corresponding elements 46b–49b are positioned on the removable board in such a manner that the respective elements slidably interfit when the removable board is moved along the guideways 45 toward the fixed board, to thereby electrically connect the respective pairs of elements.

The several motor control components 41–43 are electrically connected to the connector elements 46b–49b so as to connect and disconnect the components from the terminals 25–29 when the panel 44 is inserted and removed from the housing. In order to simplify the construction and reduce the number of wires in the control box, at least certain of the components such as the relays are advantageously positioned adjacent the board connector elements 46b–49b to enable direct connection of the components thereto. The relays themselves are advantageously of the plug-in type and motor start relay 42 has laterally extending terminal prongs designated 61a–63a and motor overload relay 43 has laterally extending terminal prongs designated 64a–66a. The prongs 61a–63a on the start relay cooperate with interfitting plug-in type connector elements 61b–63b, hereinafter sometimes referred to as component connectors, which elements, as best shown in FIG. 4, are rigidly mounted on the removable component board 44. Certain component connector elements such as 61b and 62b of the start relay 42 are advantageously mounted directly on certain of the board connector elements such as 49b and 48b respectively, by means of the aforementioned fasteners 54 and 53. The other component connector element 63b of the start relay 42 is mounted on the board as by fastener 68 and has one element 69a of a plug-in type connector rigidly secured thereto, for a reason to be described hereinafter. The prongs 64a–66a of the overload relay similarly cooperate with plug-in type component connector elements designated 64b–66b which are also rigidly mounted on the component board 44. Certain of the component connector elements such as 65b and 66b are rigidly secured by the aforementioned fasteners 51 and 52 directly to board connector elements 46b and 47b, and the other connector element 64b is secured to the board by a fastener 71. A plug-in type connector element 72a is also rigidly secured to the connector element 46b, for a purpose described hereinafter. Thus, both the motor start relay and the motor overload relay can be detachably mounted on the component board 44 and respectively connected to certain ones of the terminals 25–29 through the plug-in type board connectors. The capacitor 41 is conveniently separately mounted, as by a strap 73 on the component board 44 and is connected through wires 74 and 75 to the plug-in type connector elements 72a and 69a respectively. As shown in FIG. 4, the wires 74 and 75 have plug-in type connector elements 72b and 69b thereon which interfit with the elements 72a and 69a and, conveniently, the other ends of the wires may be connected to the capacitors through plug-in type connectors 77 and 78.

The several motor control components are standard items and further detailed description is deemed unnecessary. As diagrammatically illustrated in FIG. 5, the motor overload relay 43 includes a thermally operated switch 81 and dual heaters 82 and 83. The motor starting relay includes a switch 84 and a relay coil 85.

A pilot lamp 88 is conveniently mounted on the front wall 14 of the cover for removal therewith. As best shown in FIG. 3, the lamp includes a lamp housing 89 formed of plastic or other insulating material and which is attached to the cover by a fastener 90. The lamp housing includes a hollow transparent or translucent portion 89a which projects through the front wall of the cover and which surrounds the lamp 88. The pilot lamp is conveniently of the neon glow tube type and, as shown in FIG. 5 has a current limiting resistor 92 connected in series therewith. A pair of resilient contact fingers 93 and 94 are mounted on the lamp housing 89 and electrically connected to the ends of the series circuit including the glow tube 88 and resistor 92. The fingers 93 and 94 extend laterally and are arranged to engage the fasteners 68 and 53 which secure the component connector elements 63b and 62b to the component board. As will be noted from FIG. 5, the lamp 88 is thus connected across the starter switch 84 in the start relay 44. In the voltage-type relay illustrated, the starting relay contacts 84 are initially closed to connect the start windings 36 of the motor to the starting capacitor 41. The relay contacts 84 remain closed until the motor comes up to speed at which time the relay opens the contacts 84 and disconnects the motor start windings 36. At that time, voltage is applied across the glow tube 88 to indicate that the motor is operating properly.

The motor control is diagrammatically illustrated in FIG. 5 as applied to a submersible pump installation. The motor 38 is located remote from the control box and drives a pump 95 located in a well or tank, and the pump is connected to a delivery line 96. A conventional pressure switch 97 is connected to the delivery line 96 and to the power conductors 31 and 32 to selectively start and stop the pump in accordance with the pressure in the discharge conduit to maintain the pressure between preselected limits.

Figure 7:
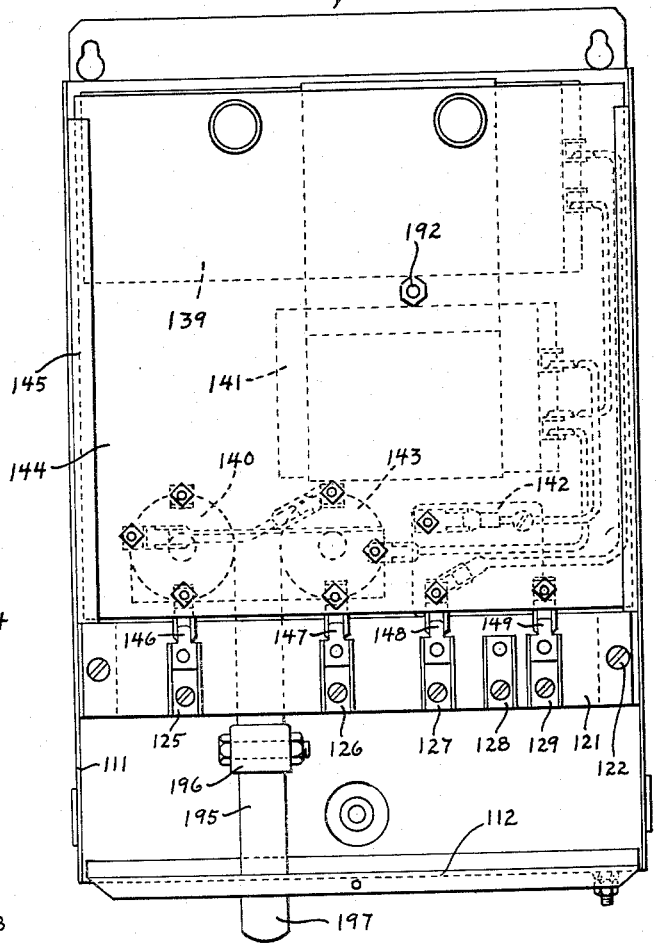
FIG. 7 is a front view of the control box of FIG. 6, with the cover removed.
Figure 8:
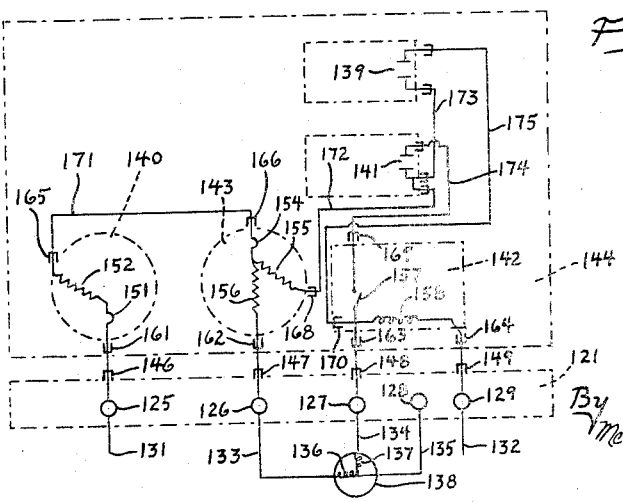
FIG. 8 is a schematic diagram illustrating the motor control box of FIG. 6.

The control box of FIGS. 6–8 is generally similar to that shown in FIGS. 1–5, but has been modified somewhat to provide space and to electrically connect a running capacitor to the motor. In general, the motor control includes a housing having a rear wall 110, bottom wall 112, and spaced side walls 111. A removable cover including a front wall 114 and a top wall 115 is mounted on the housing to form an enclosure therewith. As in the preceding embodiment, the front wall has a depending lip 117 which engages the rear wall adjacent its upper end and a fastener 118 for attaching the front wall to the bottom wall of the housing. A fixed terminal board 121 is mounted by fasteners 122 on brackets 123 attached to the side walls 111 of the housing and carries a plurality of wire connector terminals designated 125–129. Power conductors 131 and 132 are connected to terminals 125 and 129 and motor conductors 133, 134 and 135 are connected to the main and start windings 136 and 137 of the motor 138. The several motor controls including the running capacitor 139, a start capacitor 141, a motor start relay 142 and motor overload relays 140 and 143 are each mounted on a removable component board 144 for removal as a unit therewith. As in the preceding embodiment, the component board is slidably mounted in channel-shaped guideways 145 attached to the side walls 111 of the housing for sliding movement toward and away from the fixed terminal board 121. The removable component board is electrically connected to the terminal board 121 to plug-in type board connectors designated 146–149, with one element of each connector rigidly attached to the component board for removal therewith and the other element of each connector rigidly attached to the wire connector terminals 125, 126, 127 and 129 respectively, as is clearly shown in FIGS. 7 and 8.

The relays 140, 143 and 142 are of conventional construction and, as diagrammatically shown in FIG. 8, the overload relay 140 includes a thermally operated switch 151 and a heater 152. Overload relay 143 also includes a switch 154 and heaters 155 and 156. The start relay 142 includes a switch 157 and a relay 158 for operating the switch. The several relays are advantageously of the plug-in type, described more specifically in connection with FIGS. 1–5, and are each detachably mounted on the component board 144 by plug-in component connectors such as are designated 161–169. Since the construction and mounting of the several relays on the board is generally the same as that described in connection with FIGS. 1-5, further detailed description is deemed unnecessary. However, the electrical circuit for interconnecting the several elements on the board is slightly different and, as shown, the plug-in component connectors 161-164 are connected to the board connectors 146-149 respectively. A jumper 171 connects the component connectors 165 and 166 and the component connector 168 is connected through a wire 172 to one terminal of the start condenser 141. This same terminal on the start condenser is connected through a wire 173 to one terminal of the running capacitor 139. The other terminal of the start capacitor 141 is connected through conductor 174 to the plug-in connector 163, and the other terminal of the running capacitor 139 is connected through a conductor 175 through the component connector 163. The conductors 172, 173, 174 and 175 are each preferably connected to the respective elements through plug-in connectors to enable quick detachment of the several elements. The relays 140, 142 and 143 are each supported on the board by their plug-in connectors. The capacitors 139 and 141, however, are connected to the relays through flexible wires and separate means is provided for supporting the capacitors on the component board 144. As best shown in FIG. 6, a bracket 191 overlies one side of the capacitors 139 and 141 and is secured to the component board by a post 192 to detachably clamp the capacitors to the board.

The overload relays 140 and 143 are of the manual reset type and include reset button 194 (see FIG. 6). A generally T-shaped reset lever 195 is pivotally mounted on a bracket 196 attached to the side wall and has a handle portion 197 at its lower end which projects below the bottom wall 112. As shown in FIGS. 6 and 7 the crosshead on the T-shaped reset lever engages the reset buttons 194 on the overload relays to simultaneously manually reset both relays. With this arrangement, it will be noted that the component board and the reset relays can be removed and installed into the housing, without requiring disassembly of the reset lever 195.

From the foregoing it is thought that the construction and advantages of the motor control box will be readily understood. The several motor control components including the start and overload relays and the capacitors are all mounted on a single component board and are removable as a unit therewith. The component board is connected to the fixed terminal board through plug-in type board connectors so that it is unnecessary to remove any of the conductors leading to the source of power or to the motor, in order to remove and service the components. In addition, the components are advantageously mounted by plug-in component connectors on the component board so that the individual components can be readily removed for checking and replacement, if necessary. By locating the several relays close to the board connectors, the relays can, at least in part, be mounted directly on the board connectors so as to minimize the number of wires in the control box and to thereby simplify the overall construction.

We claim:

1. A motor control box for a motor having main and start windings comprising: a control box housing, a terminal board fixed to said housing and having a plurality of wire connector terminals for attaching conductors leading to a source of power and to the main and start windings of a motor, a component board separate from said housing and removable therefrom, guide means on the housing mounting the component board for sliding movement toward and away from said terminal board, motor control elements including at least one capacitor, a motor start relay and a motor overload relay each mounted on said component board for removal therewith, a group of plug-in type connectors, each connector including first and second interfitting elements, means mounting said first elements on said terminal board and for electrically connecting the same to respective ones of said wire connector terminals, means mounting said second elements on said component board to interfit with respective ones of said first elements when said component board is moved along said guide means toward said terminal board, and means on said component board electrically connecting said start relay; overload relay; and capacitor to each other and to said second elements whereby said motor control elements can be installed and removed as a unit with said component board and respectively connected and disconnected from said wire connector terminals.

2. The combination of claim 1 wherein said means connecting said start relay; overload relay; and capacitor to each other and to said second elements include plug-in type connectors to enable easy removal of individual motor control elements from said second panel.

3. A motor control box for a motor having main and start windings comprising: a control box housing a terminal board fixed to said housing and having a plurality of wire connector terminals for attaching conductors leading to a power source and to the main and start windings of a motor, a component board removably disposed in said housing, a motor start relay and a motor overload relay each having terminal prongs extending laterally therefrom, a first group of plug-in type connector elements mounted on said component board slidably receiving said terminal prongs to detachably mount the relays on the component board, a second group of plug-in type connectors each including one connector element mounted on said terminal board and electrically connected to a respective one of said connector terminals and an interfitting connector element mounted on said component board and electrically connected to a respective one of said plug-in connector elements of said first group, said connector elements of said second group being positioned on said terminal and component boards so that respective ones thereof slidably interfit when said component board is positioned in the housing to thereby electrically connect the relays to the motor and enable removal of said start and overload relays as a unit with said component board, a motor capacitor mounted on said component board for removal therewith, and means including plug-in type connectors electrically connecting said capacitor to certain of said connector elements of said first group on said component board.

4. A motor control box for a motor having main and start windings comprising: a control box housing, a terminal board fixed to said housing and having a plurality of wire connector terminals for attaching conductors leading to a power source and to the main and start windings of a motor, a component board separate from said housing and removable therefrom, guide means on the housing mounting the component board for sliding movement toward and away from said terminal board, motor control elements including at least one capacitor, a motor start relay and a motor overload relay, said relays each having terminal prongs rigid therewith and extending laterally therefrom, said capacitor having terminal prongs electrically connected thereto, a first group of plug-in type connector elements rigidly mounted on said component board and slidably receiving said terminal prongs to detachably connect said relays and capacitor to the component board, a second group of plug-in type connectors each including one connector element mounted on said terminal board and electrically connected to different ones of said connector terminals and an interfitting connector element mounted on said component board and electrically connected to different ones of the plug-in connector elements of said first group, said connector elements of said second group of connectors being positioned on said terminal and component boards so that respective ones thereof slidably interfit when the component board is moved along said guide means toward said terminal board to thereby electrically connect the relays and capacitor to the wire connector terminals and enable removal of the motor control elements as a unit with said component board.

5. The combination of claim 4 wherein said housing has a cover overlying one side of said component board, a pilot lamp mounted on said cover, and resilient contact fingers connected to said lamp and engageable with selected ones of said connector elements on said component board when the cover is closed to indicate when the motor is running.

6. The combination of claim 4 wherein at least one of said relays has a reset button, and a lever pivoted on said housing and engageable with said reset button when the component board is positioned in the housing for resetting the relay.

References Cited by the Examiner
UNITED STATES PATENTS

| | | | |
|---|---|---|---|
| 2,287,797 | 6/42 | Hanley | 317—99 |
| 2,719,251 | 9/55 | Stewart | 317—120 |

LARAMIE E. ASKIN, *Primary Examiner.*

SAMUEL BERNSTEIN, JOHN F. BURNS, *Examiners.*